(12) United States Patent
Woo

(10) Patent No.: US 7,746,346 B2
(45) Date of Patent: Jun. 29, 2010

(54) METHOD AND SYSTEM OF RENDERING 3-DIMENSIONAL GRAPHICS DATA TO MINIMIZE RENDERING AREA, RENDERING TIME, AND POWER CONSUMPTION

(75) Inventor: Sang Oak Woo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 11/657,591

(22) Filed: Jan. 25, 2007

(65) Prior Publication Data
US 2007/0182748 A1 Aug. 9, 2007

(30) Foreign Application Priority Data
Feb. 8, 2006 (KR) ............ 10-2006-0012226

(51) Int. Cl.
*G06T 1/20* (2006.01)
(52) U.S. Cl. ............ 345/506; 345/419; 345/537; 345/538; 345/539; 345/545; 345/546; 345/547; 345/473; 345/474
(58) Field of Classification Search ............ 345/419, 345/473, 474, 537, 538, 539, 597, 423, 545, 345/546, 547, 506, 426, 501
See application file for complete search history.

(56) References Cited

U.S. PATENT DOCUMENTS

| | | | |
|---|---|---|---|
| 6,556,197 B1 * | 4/2003 | Van Hook et al. ............ | 345/419 |
| 6,593,929 B2 * | 7/2003 | Van Hook et al. ............ | 345/501 |
| 7,023,437 B1 * | 4/2006 | Voorhies et al. ............ | 345/420 |

FOREIGN PATENT DOCUMENTS

| | | |
|---|---|---|
| JP | 11-065813 | 3/1999 |
| JP | 2001-043393 | 2/2001 |
| JP | 2002-352263 | 12/2002 |

OTHER PUBLICATIONS

Nishikawa Genji, "3D graphics analytics for understanding DirectX 9, Part 1", DOS/V magazine, Japan, Soft Bank Publishing, Oct. 15, 2002, eleventh volume, twentieth edition, p. 85-95.
Notice of Rejection with filed date of Sep. 24, 2009, issued by Japanese patent office for Japanese Patent Application No. 2007-024326 (corresponding application to instant U.S. Appl. No. 11/657,591).

* cited by examiner

*Primary Examiner*—Kimbinh T Nguyen
(74) *Attorney, Agent, or Firm*—NSIP Law

(57) ABSTRACT

A three-dimensional graphics data rendering method. The method divides initially inputted first graphics data into a static object and a dynamic object, performs a rendering process with respect to the static object, and updates a predetermined buffer with the rendering result. Then the method performs a transformation process, a portion of the rendering process with respect to the dynamic object, determines an updating area, and stores a rendering result of the buffer corresponding to the updating area in a predetermined storage unit; performs a remaining rendering process with respect to the dynamic object, updates the buffer and outputs a first image whose rendering is completed. Finally, the method restores a rendering result of the updating area to the buffer by referring to the storage unit and utilizes a rendering result of the restored buffer as a rendering result of subsequently inputted second graphics data.

22 Claims, 4 Drawing Sheets

400

401

500

METHOD AND SYSTEM OF RENDERING 3-DIMENSIONAL GRAPHICS DATA TO MINIMIZE RENDERING AREA, RENDERING TIME, AND POWER CONSUMPTION

CROSS-REFERENCE TO RELATED APPLICATIONS

This application claims the benefit of Korean Patent Application No. 2006-12226, filed on Feb. 8, 2006 in the Korean Intellectual Property Office, the disclosure of which is incorporated herein by reference.

BACKGROUND OF THE INVENTION

1. Field of the Invention

Aspects of the present invention relate to a method and system of rendering three-dimensional graphics data which can reduce a rendering area, and more particularly, to a rendering method and system which can reduce an amount of graphics data and a rendering area to be rendered and also improve a rendering speed by determining whether a viewpoint between consecutively inputted first graphics data and second graphics data is identical, and when identical, utilizing a rendering result of a static object of the first graphics data as a rendering result of the second graphics data, and rendering only the dynamic object.

2. Description of the Related Art

A process of rendering three-dimensional graphics data according to the conventional art will be described.

1) When three-dimensional graphics data is inputted, a three-dimensional graphics data rendering system according to the conventional art clears buffers, including a back buffer, a Z buffer, etc. In this instance, the three-dimensional graphics data rendering system clears buffers by setting a value of the back buffer as a background color value and setting a value of the Z buffer as a maximum value that the Z buffer can indicate.

2) While performing a pipeline operation with respect to all of the objects included in the three-dimensional graphics data, the three-dimensional graphics data rendering system updates other buffers, such as a back buffer and a Z buffer.

The pipeline operation includes a transformation process to convert three-dimensional graphics data into two-dimensional graphics data, a lighting process to adjust a color according to light source information, and a rasterization process to converting a transformed and color-adjusted triangle into a corresponding image. When all triangles of three-dimensional graphics data are processed as described above, each small image of each triangle is collected to generate a final image.

3) The three-dimensional graphics data rendering system transmits the updated back buffer to a print buffer to display the processed image on a screen.

4) When three-dimensional graphics data corresponding to a next frame is inputted, the three-dimensional graphics rendering system repeats operations 1) through 3).

However, the conventional three-dimensional graphics rendering technique according to the conventional art performs the operation 1 whenever rendering inputted three-dimensional graphics data. Accordingly, when additional three-dimensional graphics data is inputted, all objects displayed on the screen have to be re-drawn.

In particular, even when maintaining a certain viewpoint and moving only a particular object, such as a mobile three-dimensional user interface, the operation 1) of clearing a buffer is repeated whenever rendering three-dimensional graphics data, which is extremely ineffective.

Also, the conventional three-dimensional graphics data rendering technique as described above renders all objects regardless of whether the image viewpoint moves. Similarly, the conventional three-dimensional graphics rendering technique renders all objects regardless of whether the object itself moves. Accordingly, rendering speed is decreased and the quality of the rendered image is reduced. In addition, the rendering process consumes a lot of power.

Accordingly, a rendering method is needed which can increase a rendering speed, improve the quality of a rendered image, and can also reduce power consumption by adjusting a rendering range according to a movement of a rendering point and a movement of an object.

SUMMARY OF THE INVENTION

Aspects of the present invention provide a method and system of rendering three-dimensional graphics data which can identify a rendering area according to a movement of a viewpoint of inputted graphics data and presence of a dynamic object and thus, can reduce the rendering area and increase a rendering speed.

Aspects of the present invention also provide a method and system of rendering three-dimensional graphics data which can omit a process of clearing a buffer and rendering a static object in rendering second graphics data and thus, can significantly improve a rendering speed and also can render three-dimensional graphics data with lower power consumption.

Aspects of the present invention also provide a method and system of rendering three-dimensional graphics data which can provide high definition three-dimensional graphics when utilizing the same memory or calculation module as in a conventional art, by reducing a number of objects and a rendering area to be rendered and thus, decreasing an amount of calculations necessary for rendering.

According to an aspect of the present invention, there is provided a method of rendering three-dimensional graphics data, the method including: dividing initially inputted first graphics data into a first static object and a first dynamic object, performing a first rendering process with respect to the first static object and updating a buffer with the result of the rendering, the rendering result including rendered color information or depth information with respect to the first graphics data; performing a transformation process, performing a portion of a second rendering process with respect to the first dynamic object, determining an updating area, and storing a portion of the rendering result corresponding to the updating area in a predetermined storage unit; performing a remaining portion of the second rendering process with respect to the first dynamic object, updating the buffer with the result of the second rendering process with respect to the first dynamic object, and outputting a first image whose rendering is completed; and restoring the rendering result of the updating area to the buffer by referring to the storage unit to create a restored buffer, and utilizing the restored buffer as a second rendering result of subsequently inputted second graphics data.

According to another aspect of the present invention, there is provided a system of rendering three-dimensional graphics data, the system including: a rendering module to divide initially inputted first graphics data into a first static object and a first dynamic object, performing a first rendering process with respect to the first static object and updating a buffer with a result of the first rendering process, the rendering result including rendered color information or depth information with respect to the first graphics data; a storage unit to perform a transformation process, to perform a portion of a second rendering process with respect to the second dynamic object, to determine an updating area, and to store a portion of the rendering result corresponding to the updating area; an output module to perform a remaining portion of the second rendering process with respect to the first dynamic object, to update the buffer with the result of the second rendering process, and to output a first image whose rendering is completed; and an updating area restoration module to restore the rendering result of the updating area to the buffer by referring to the storage unit to create a restored buffer, and to utilize the restored buffer as a second rendering result of subsequently inputted second graphics data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
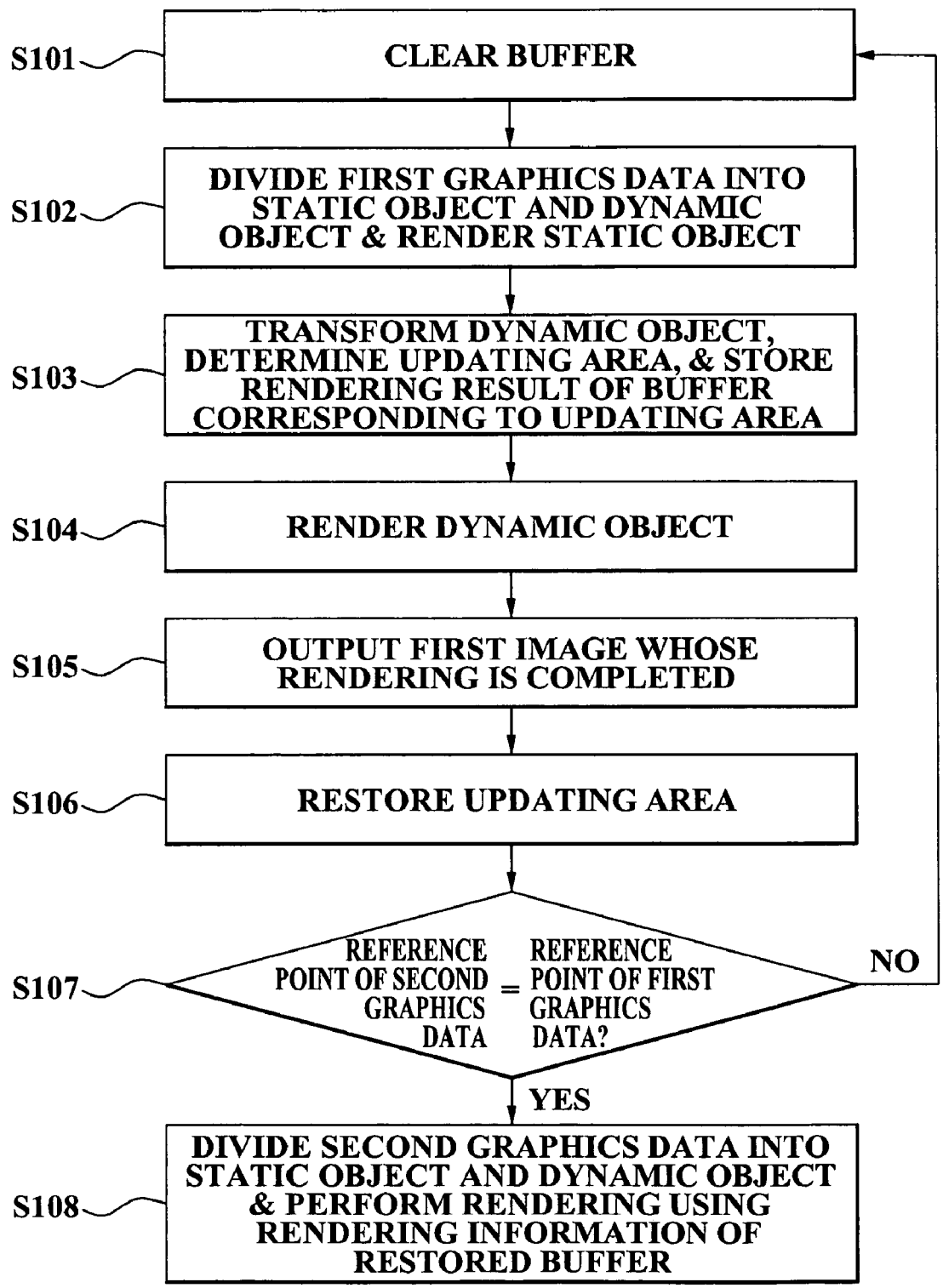
FIG. 1 is a flowchart illustrating a process of rendering consecutively inputted three-dimensional graphics data according to an embodiment of the present invention.

Reference will now be made in detail to present embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a process of rendering consecutively inputted three-dimensional graphics data according to an embodiment of the present invention. The rendering system receives graphics data to be rendered and stores the received graphics data in a predetermined storage unit, such as the storage unit 602 shown in FIG. 6. In this instance, the graphics data may include viewpoint information, e.g., camera information; light source information, e.g., brightness, location, and direction; and object information with respect to three-dimensional graphics data. In addition, the object information may include shape information of an object included in the three-dimensional graphics data; movement information, e.g., any change in location, size, and direction; and property information, e.g., a color and a material. The rendering system performs rendering based on the inputted graphics data and thereafter updates various buffers, such as a Z buffer and a back buffer. The Z buffer stores depth information for each pixel and the back buffer stores color information for each pixel.

In operation S101, the rendering system clears buffers, such as the Z buffer and the back buffer, before rendering three-dimensional graphics data inputted for each frame. For example, the rendering system may clear buffers by setting a value of the back buffer to a background color value of a finally processed image and setting a value of the Z buffer to a maximum value that the Z buffer can hold.

In operation S102, the rendering system divides initially inputted first graphics data into static objects and dynamic objects, performs a rendering process with respect to the static objects, and stores the result of the rendering in a predetermined buffer. In this instance, the rendering system divides the objects included in the first graphics data into a static object and a dynamic object, by referring to the graphics data stored in the storage unit.

Dynamic objects may include 1) objects in movement, i.e., objects changing location, direction, size, etc.; 2) objects with a change in property information, i.e., objects with a change in color information, material information, etc.; and 3) objects with a change in light source information affecting the objects, i.e., with a light source changing color, brightness, location, direction, etc., which in turn alters some aspect of the object.

The rendering process may be a three-dimensional pipeline. While performing a three-dimensional graphics pipeline process with respect to the first graphics data, the rendering system updates the rendering result in the buffers, such as the back buffer, the Z buffer, etc. In this instance, the three-dimensional graphics pipeline process includes a transformation process transforming three-dimensional graphics data into two-dimensional graphics data, a lighting process adjusting a color according to light source information and a rasterization process converting a transformed and color-adjusted triangle into a corresponding pattern image.

Figure 2:
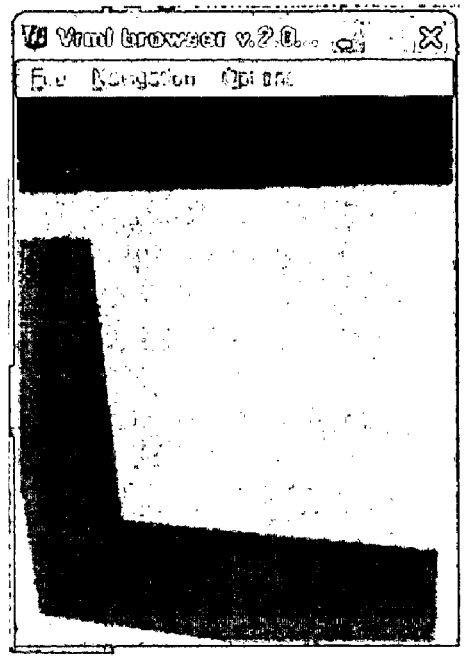
FIG. 2 illustrates an image which is obtained by rendering a static object included in first graphics data according to an embodiment of the present invention.

The rendering result, which is stored in the buffers, includes rendered color information or depth information with respect to static objects in the first graphics data. The rendering system may store color information for each pixel to the back buffer and store depth information for each pixel to the Z buffer. FIG. 2 illustrates an image obtained by rendering a static object included in first graphics data according to an embodiment of the present invention.

Figure 3:
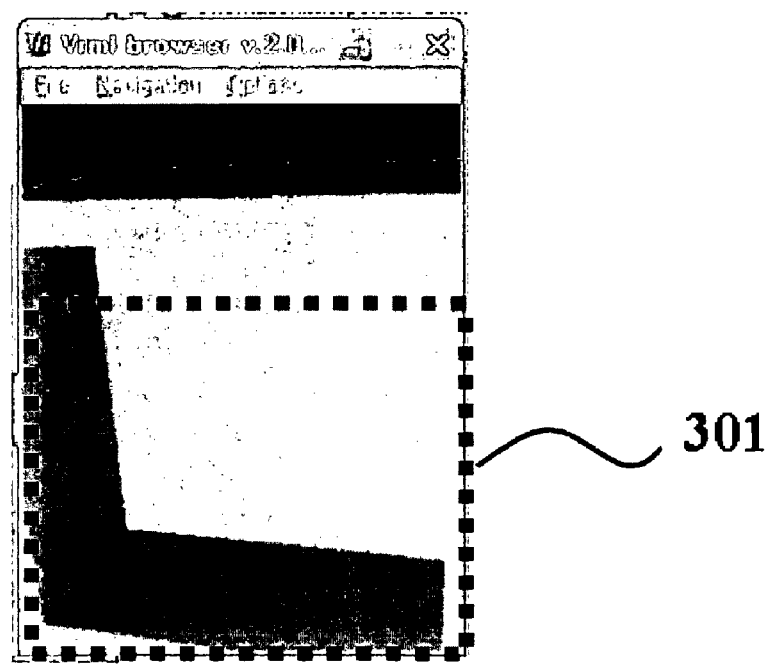
FIG. 3 illustrates an example of determining an updating area of the obtained image of FIG. 2 according to an embodiment of the present invention.

In operation S103, the rendering system performs a transformation process, performs a portion of the rendering process with respect to the dynamic object, determines an updating area, and stores a portion of the rendering result (obtained in operation S102) corresponding to the updating area in a predetermined storage unit. FIG. 3 illustrates an example of determining an updating area of the image shown in FIG. 2 according to an embodiment of the present invention. The rendering system transforms a dynamic object, which is three-dimensional graphics data, into two-dimensional graphics data and determines a square area 301 requiring updating.

For example, the rendering system transforms three-dimensional graphics data into two-dimensional graphics data, and determines the updating area to be the square area 301, which is the minimum area capable of containing the two-dimensionally transformed area. Determining the square area 301 as the updating area reduces the amount of system calculations. When the updating area 301 is determined, the rendering system stores in the storage unit the rendering result of the pixels corresponding to the updating area 301 in the buffer.

In operation S104 of FIG. 1, the rendering system performs a remaining rendering process with respect to the dynamic object, updates the buffer with the result of rendering the dynamic object, and outputs a first image whose rendering is completed. The remaining rendering process may include a rasterization process and a lighting process adjusting color according to light source information in a three-dimensional graphics pipeline process.

Figure 4:
FIG. 4 illustrates a first image outputted by performing a remaining rendering process with respect to a dynamic object of first graphics data according to an embodiment of the present invention.

FIG. 4 illustrates a first image outputted by performing a remaining rendering process with respect to a dynamic object of first graphics data according to an embodiment of the present invention. The rendering system performs a remaining rendering process with respect to a dynamic object 401, thereby completing rendering, transmits the updated back buffer to a printer buffer, and outputs a rendered first image in operation S105 of FIG. 1.

In operation S106 of FIG. 1, the rendering system restores the rendering result of the updating area to the buffer by referring to the rendering result stored in the storage unit in operation S103, and utilizes the restored buffer as a rendering result of subsequently inputted second graphics data.

Figure 5:
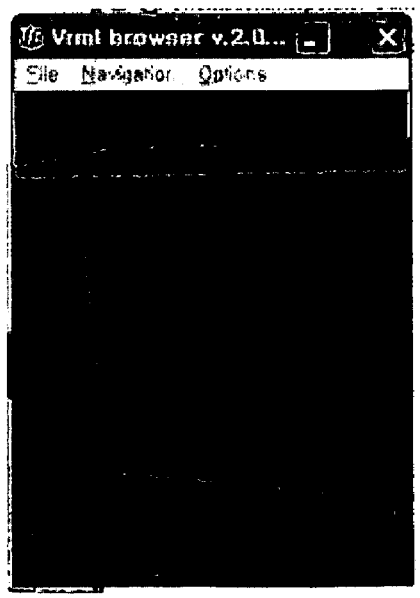
FIG. 5 illustrates a rendering result of an updating area restored to a buffer according to an embodiment of the present invention.

FIG. 5 illustrates a rendering result of an updating area restored to a buffer according to an embodiment of the present invention. When comparing a first image 400 shown in FIG. 4 and FIG. 5, the rendering system restores a rendering result of the updating area stored in the storage unit to buffers such as the Z buffer and the back buffer. Through this, the dynamic object may be restored to its original state before rendering.

In operation S107 of FIG. 1, when second graphics data corresponding to the next frame is inputted, the rendering system determines whether a viewpoint of the second graphics data is identical to a viewpoint of the first graphics data. When the viewpoint is not identical, the rendering system has to render three-dimensional graphics data from another point of view. Namely, the rendering system has to re-perform operations S101 through S106 and accordingly, clears the buffers (including the Z buffer, the back buffer, etc.) and renders all static and dynamic objects of the second graphics data.

When the viewpoint is identical, the rendering system utilizes a rendering result of the restored buffer as a rendering result of the second graphics data. Specifically, in operation S108 shown in FIG. 1, the rendering system divides the second graphics data into dynamic objects and static objects and uses the rendering result of the restored buffer as the rendering result of the (newly created) static objects. Accordingly, the rendering system does not need to clear the buffers and render the static object again. For example, when a viewpoint of first graphics data is identical to a viewpoint of second graphics data, the rendering system utilizes a rendering result 500 of a buffer in which the static object of FIG. 2 is restored, and renders only a dynamic object of the second graphics data without rendering a static object of the second graphics data. Accordingly, the rendering system according to aspects of the present invention may perform a rendering process with respect to second graphics data, omitting operations S101 and S102. This can significantly improve rendering speed and significantly lower power consumption.

Also, according to aspects of the present invention, since a rendering area is reduced, redundant rendering processes need not be performed. Accordingly, high definition three-dimensional graphics may be provided even when utilizing the same memory or calculation modules as in the conventional art. In addition, according to aspects of the present invention, rendering speed may be increased by adjusting a rendering range according to a movement of a viewpoint of inputted graphics data and a movement of an object of the inputted graphics data.

The rendering method according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The present invention can be embodied in transmission media such as optical or metallic lines, wave guides, etc. including a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 6:
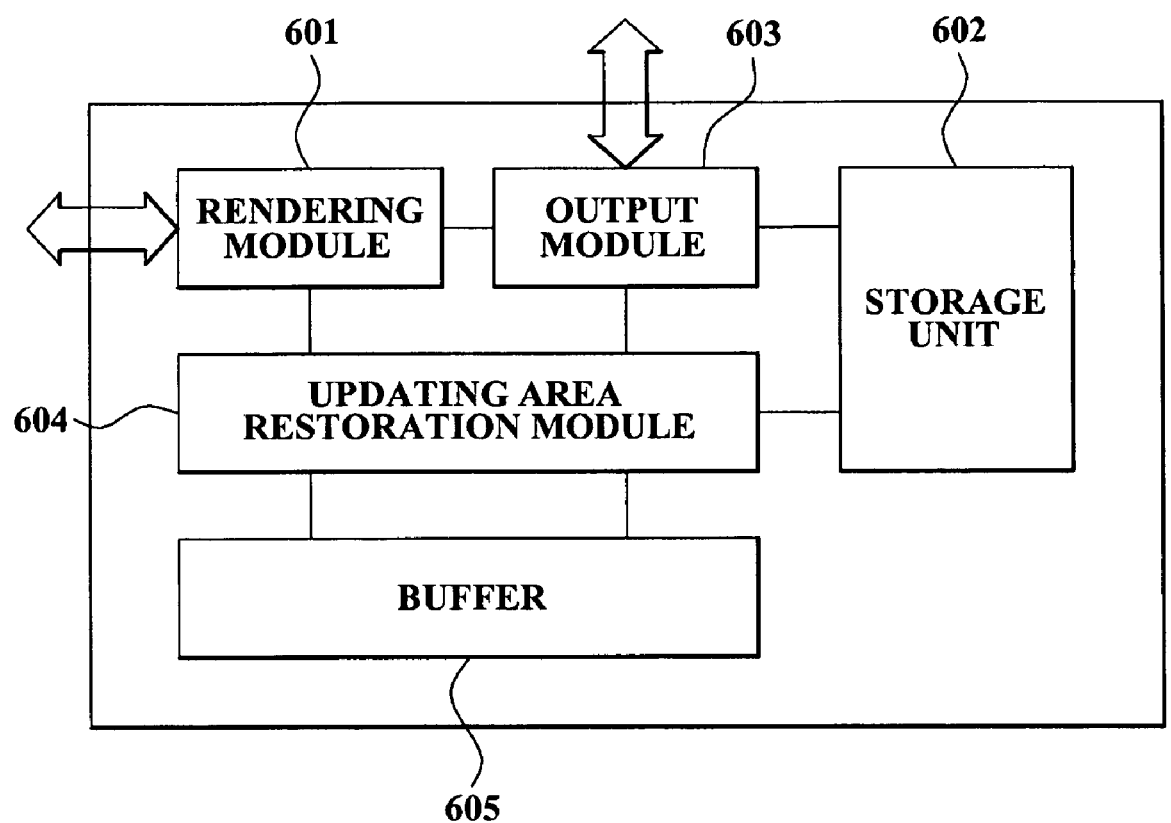
FIG. 6 is a block diagram illustrating a configuration of a rendering system according to an embodiment of the present invention.

FIG. 6 is a block diagram illustrating a configuration of a rendering system according to an embodiment of the present invention. The rendering system may include a rendering module 601, a storage unit 602, an output module 603, an updating area restoration module 604 and a buffer 605. The rendering system may include other components as well. Similarly, the functionality of two or more components may be combined into a single component.

The rendering module 601 initially clears the buffer 605, divides first graphics data into a static object and a dynamic object, performs a rendering process with respect to the static object, and stores the rendering result to the buffer 605. The buffer 605 may include a Z buffer, a back buffer, etc. The rendering result may include color information or depth information of the rendering result with respect to the first graphics data. The Z buffer may maintain depth information of the rendering result and the back buffer may maintain color information of the rendering result.

The storage unit 602 performs a transformation process, performs a portion of the rendering process with respect to the dynamic object, determines an updating area, and stores the portion of the rendering result of the buffer corresponding to the updating area. The storage unit 602 may include a memory, a database, etc.

The output module 603 performs a remaining rendering process with respect to the dynamic object, updates the buffer 605, and outputs a first image whose rendering is completed. The remaining rendering process may include a lighting process and a rasterization process. The updating area restoration module 604 restores the rendering result of the updating area to the buffer by referring to the storage unit 602, and utilizes the restored buffer as a rendering result of subsequently inputted second graphics data. The updating area restoration module 604 determines whether a viewpoint of the first graphics data is identical to a viewpoint of the second graphics data, and when the viewpoint is identical, utilizes the rendering result of the restored buffer as the rendering result of the subsequently inputted second graphics data. The updating area restoration module 604 divides the second graphics data into dynamic objects and static objects and determines the rendering result of the restored buffer as the rendering result of the static object.

According to aspects of the present invention, it is possible to identify a rendering area according to a movement of a viewpoint of inputted graphics data and presence of a dynamic object and thus reduce the rendering area.

Also, according to aspects of the present invention, when rendering second graphics data, processes of clearing a buffer and rendering static objects may be omitted. Accordingly, rendering speed may be significantly improved and three-dimensional graphics data may be rendered with a lower power consumption.

Also, according to aspects of the present invention, by reducing the number of objects and rendering areas to be rendered, redundant rendering processes are not performed. Accordingly, the amount of calculations necessary for rendering may be reduced. Also, high definition three-dimensional graphics may be provided even when utilizing the same memory or calculation modules as in the conventional art.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of rendering three-dimensional graphics data, the method comprising:
dividing initially inputted first graphics data into a first static object and a first dynamic object;
performing a first rendering process with respect to the first static object;
updating a buffer with a result of the rendering, the rendering result including rendered color information or depth information with respect to the first graphics data;
performing a transformation process;
performing a portion of a second rendering process with respect to the first dynamic object;
determining an updating area;
storing a portion of the rendering result corresponding to the updating area in a predetermined storage unit;
performing a remaining portion of the second rendering process with respect to the first dynamic object;
updating the buffer with the result of the second rendering process with respect to the first dynamic object;
outputting a first image whose rendering is completed;
restoring the rendering result of the updating area to the buffer by referring to the storage unit to create a restored buffer; and
utilizing the restored buffer as a second rendering result of subsequently inputted second graphics data.

2. The method of claim 1, wherein the restoring of the rendering result and the utilizing of the restored buffer determines whether a viewpoint of the first graphics data is identical to a viewpoint of the second graphics data, and when the viewpoint is identical, utilizes the restored buffer as the second rendering result of the subsequently inputted second graphics data.

3. The method of claim 1, wherein the restoring of the rendering result and the utilizing of the restored buffer divides the second graphics data into a second dynamic object and a second static object and determines a portion of the second rendering result corresponding to the second static object as the contents of the restored buffer.

4. The method of claim 1, wherein:
the buffer comprises a Z buffer and a back buffer; and
the Z buffer maintains depth information of graphics data and the back buffer maintains color information of the graphics data.

5. The method of claim 1, wherein the dividing of the first graphics data, rendering of the static object and updating of the rendering result comprises initially clearing the buffer, rendering the first static object, and updating the rendering result of the buffer.

6. The method of claim 1, wherein the second rendering process comprises lighting and rasterization.

7. The method of claim 1, wherein the restoring of the rendering result and the utilizing of the rendering result determines the rendering result stored in the restored buffer as the second rendering result of a second static object of the second graphics data.

8. A computer readable storage medium having computer-executable instructions to perform a method of rendering three-dimensional graphics data, comprising instructions to cause a computer to:
divide initially inputted first graphics data into a first static object and a first dynamic object;
perform a first rendering process with respect to the first static object;
update a buffer with a result of the rendering, the rendering result including rendered color information or depth information with respect to the first graphics data;
perform a transformation process;
perform a portion of a second rendering process with respect to the first dynamic object;
determine an updating area;
store a portion of the rendering result corresponding to the updating area in a predetermined storage unit;
perform a remaining portion of the second rendering process with respect to the first dynamic object;
update the buffer with the result of the second rendering process with respect to the first dynamic object;
output a first image whose rendering is completed;
restore the rendering result of the updating area to the buffer by referring to the storage unit to create a restored buffer; and
utilize the restored buffer as a second rendering result of subsequently inputted second graphics data.

9. The method according to claim 1, wherein determining the updating area comprises a minimum area capable of containing the partially rendered first dynamic object.

10. The computer readable storage medium according to claim 8, wherein the restoring of the rendering result and the utilizing of the restored buffer determines whether a viewpoint of the first graphics data is identical to a viewpoint of the second graphics data, and when the viewpoint is identical, utilizes the rendering result stored in the restored buffer as the second rendering result of the subsequently inputted second graphics data.

11. The computer readable storage medium according to claim 8, wherein the restoring of the rendering result and the utilizing of the restored buffer divides the second graphics data into a second dynamic object and a second static object and determines a portion of the second rendering result corresponding to the second static object as the contents of the restored buffer.

12. The computer readable storage medium according to claim 8, wherein:
the buffer comprises a Z buffer and a back buffer; and
the Z buffer maintains depth information of graphics data and the back buffer maintains color information of the graphics data.

13. The computer readable storage medium according to claim 8, wherein the dividing of the first graphics data, rendering of the static object and updating of the rendering result comprises initially clearing the buffer, rendering the first static object, and updating the rendering result of the buffer.

14. The computer readable storage medium according to claim 8, wherein the second rendering process comprises lighting and rasterization.

15. A system to render three-dimensional graphics data, the system comprising:
   a rendering module to divide initially inputted first graphics data into a first static object and a first dynamic object, to perform a first rendering process with respect to the first static object, and to update a predetermined buffer with a result of the first rendering process, the first rendering result including rendered color information or depth information with respect to the first graphics data;
   a storage unit to perform a transformation process, to perform a portion of a second rendering process with respect to the dynamic object, to determine an updating area, and to store a portion of the first rendering result corresponding to the updating area;
   an output module to perform a remaining portion of the second rendering process with respect to the first dynamic object, to update the buffer with the result of the second rendering process, and to output a first image whose rendering is completed; and
   an updating area restoration module to restore the first rendering result of the updating area to the buffer by referring to the portion of the first rendering result stored in the storage unit to create a restored buffer, and to utilize the restored buffer as a second rendering result of subsequently inputted second graphics data.

16. The system of claim 15, wherein the updating area restoration module determines whether a viewpoint of the first graphics data is identical to a viewpoint of the second graphics data, and when the viewpoint is identical, utilizes the restored buffer as the second rendering result of the subsequently inputted second graphics data.

17. The system of claim 15, wherein the updating area restoration module divides the second graphics data into a second dynamic object and a second static object and determines the rendering result stored in the restored buffer as the second rendering result corresponding to the second static object.

18. The system of claim 15, wherein:
   the buffer comprises a Z buffer and a back buffer; and
   the Z buffer maintains depth information of graphics data and the back buffer maintains color information of the graphics data.

19. The system of claim 15, wherein the rendering module initially clears the buffer, renders the first static object and updates the rendering result of the buffer.

20. The system of claim 15, wherein the second rendering process comprises lighting and rasterization.

21. A method to reduce the time, cost, and size of rendering three-dimensional graphics data, comprising:
   clearing a buffer;
   dividing first graphics data into a plurality of first static objects and first dynamic objects;
   rendering the plurality of first static objects to create a first rendering result;
   storing the first rendering result into the buffer;
   determining an updating area of the plurality of static objects;
   storing a portion of the first rendering result corresponding to the static objects into a storage unit;
   rendering the plurality of first dynamic objects to create a second rendering result;
   storing the second rendering result into the buffer to create a first image corresponding to the first graphics data;
   restoring the updating area stored in the storage unit to the buffer;
   comparing a reference point of second graphics data to a reference point of the first graphics data; and
   repeating the method using the contents of the buffer as the rendering result for a plurality of static objects in the second graphics data and without clearing the buffer, if the reference point of the second graphics data is the same as the reference point of the first graphics data.

22. A method to reduce the time, cost, and size of rendering three-dimensional graphics data, comprising:
   clearing a buffer;
   rendering a plurality of first static objects in first graphics data and a plurality of dynamic objects in the first graphics data;
   storing the result of the rendering into the buffer to create a first image corresponding to the first graphics data; and
   repeating the method using the result of the rendering of the plurality of first static objects as the rendering result for a plurality of second static objects in second graphics data and without clearing the buffer, if a reference point of the second graphics data is the same as a reference point of the first graphics data.

* * * * *